March 20, 1962 — E. NATHAN — 3,025,950
HOLDER FOR CONTACT LENSES
Filed July 22, 1960 — 2 Sheets-Sheet 1
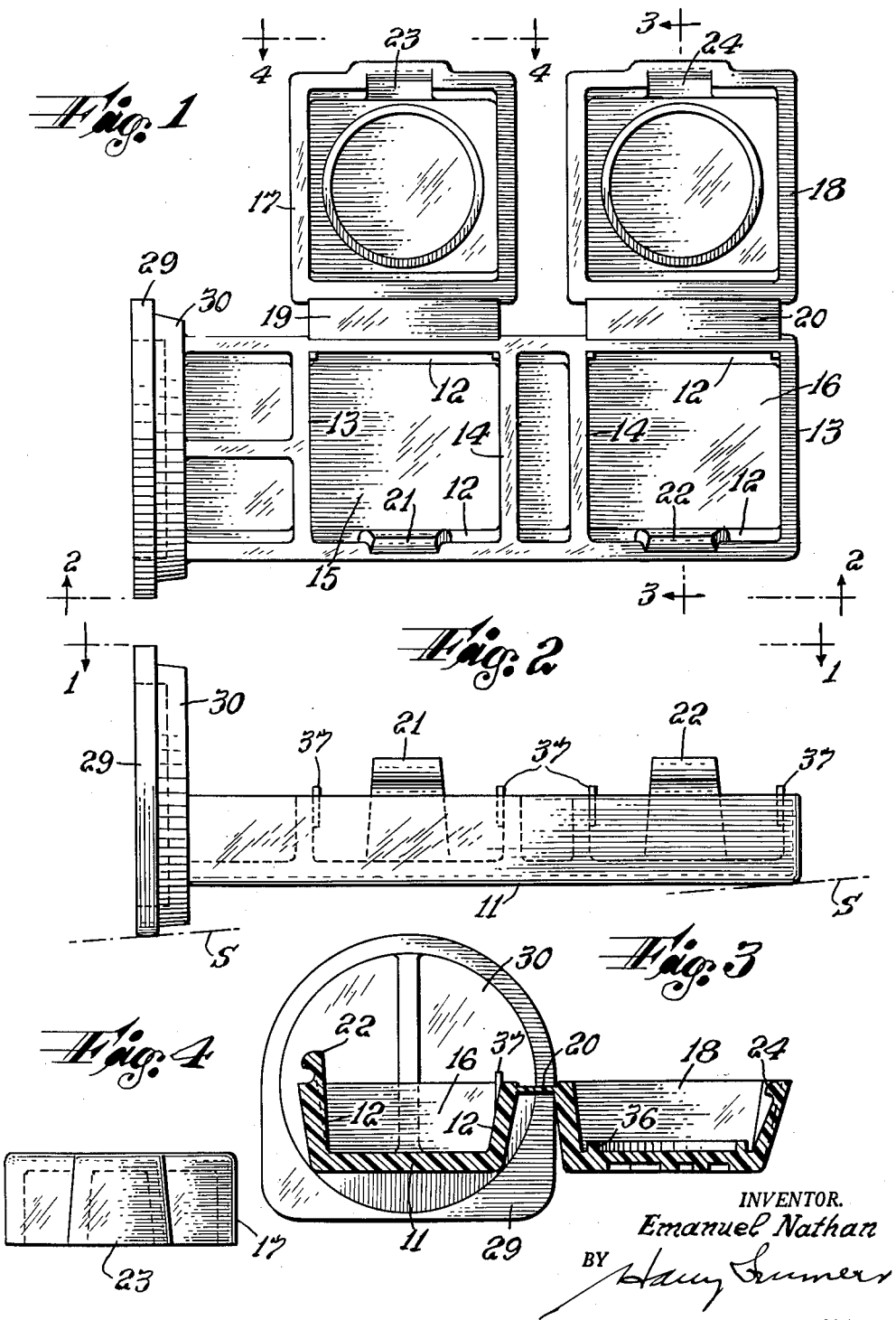
INVENTOR.
Emanuel Nathan
BY Harry Sumers
ATTORNEY March 20, 1962  E. NATHAN  3,025,950
HOLDER FOR CONTACT LENSES
Filed July 22, 1960  2 Sheets-Sheet 2
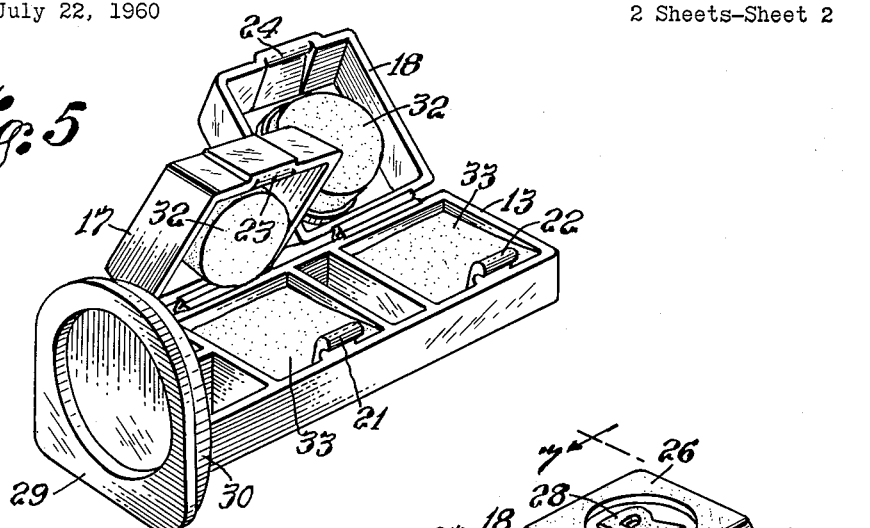
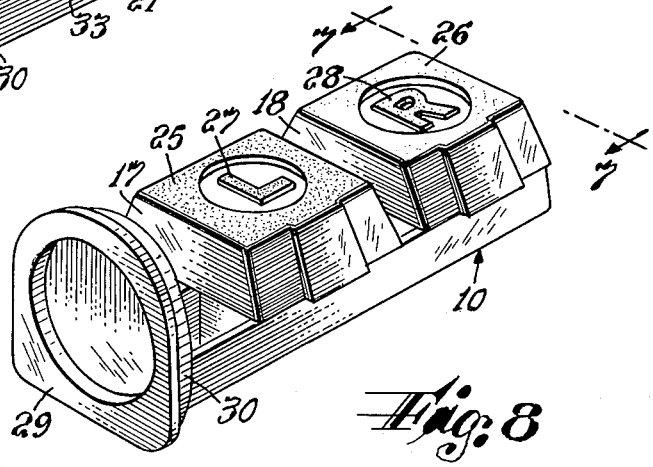
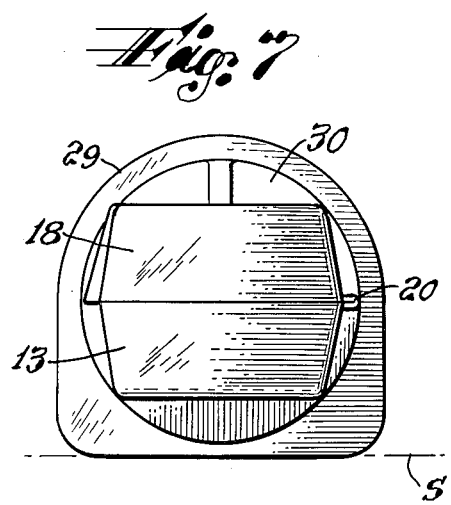
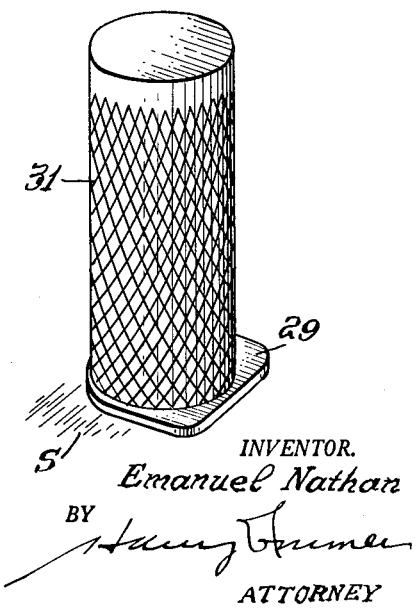
INVENTOR.
Emanuel Nathan
BY
ATTORNEY

United States Patent Office 3,025,950
Patented Mar. 20, 1962

3,025,950
HOLDER FOR CONTACT LENSES
Emanuel Nathan, South Orange, N.J., assignor to The Opticase Company, Newark, N.J., a partnership
Filed July 22, 1960, Ser. No. 44,736
4 Claims. (Cl. 206—5)

This invention relates to contact lenses, which are becoming increasingly more popular and have gone into extensive use. One of the problems encountered in the use of such lenses is to prevent contamination thereof, when not in use, by foreign particles and objects. It is further desirable that such lenses be slightly moistened to protect the material of which they are made and to facilitate their use.

As each lens is optically conformed to one of the eyes, it is further desirable to identify and separate the lenses when not in use.

My invention recognizes the problems above discussed and provides a novel means for holding such lenses and for preventing contamination, while facilitating immediate selection of the lens required for each eye. The holder includes novel features of construction and operation for attaining the desirable objectives outlined and others as will appear from the description below and from the accompanying drawings, wherein similar reference characters indicate like parts and which exemplify preferred forms of the invention and wherein:

FIG. 1 is a top plan view of a holder for optical contact lenses embodying the invention, shown open, and taken at line 1—1 of FIG. 2, FIG. 2 is a side elevational view thereof, taken at line 2—2 of FIG. 1, FIG. 3 is a transverse sectional view, taken at line 3—3 of FIG. 1, FIG. 4 is a side elevational view of a cover member, taken at line 4—4 of FIG. 1, FIG. 5 is a perspective view of a holder embodying the invention, shown partly open, FIG. 6 is a similar view thereof, closed, FIG. 7 is an end elevational view, taken at line 7—7 of FIG. 6, and FIG. 8 is a view similar to FIG. 6, but showing the holder closed by a closure cup.

As shown in the drawings, the device of the invention comprises a holder 10 (FIG. 6) formed of any suitable plastic or other material, having a flat plate portion 11 (FIG. 2) adapted to be positioned on the supporting surface S (FIGS. 2 and 7) and provided with side and end walls 12, 13 and transverse walls 14 intermediate the side walls 12 (FIG. 1) and defining, with the end walls, pockets 15, 16 for reception of the contact lenses.

Hollow cover members 17, 18 (FIG. 5) are proportioned to close said pockets when positioned thereon (FIG. 6) and are connected to the pockets 15, 16 in registry by means 19, 20 (FIG. 1) which may comprise flexible web members connecting the pocket and cover members at adjacent portions thereof (FIG. 3) and which may be molded with the other parts of said holder in the initial molding operation or formed as separate parts subsequently secured to said pocket and cover members to connect the same as above described. The pocket and cover members are provided with complementary interengaging latching means for closing the cover members onto the pocket members (FIG. 6). Said complementary latching means (FIG. 1) to interlatch the parts when the cover members are positioned against the upper edges of the pocket members (FIG. 6) may be defined by providing the pocket or cover members with longitudinally recessed ledge members 21, 22 (FIGS. 3 and 1) and providing the other of said pocket and cover members with complementary longitudinal protuberances 23, 24 (FIG. 5) for interengagement therewith when (FIG. 6) the cover members are closed on the pocket members. The cover members may be marked exteriorly for identification—for example, by forming one of said cover members (17, FIG. 6) with a stippled outer surface 25 and forming the other cover member (18) with a smooth surface 26; said cover members may also be marked "L" and "R" (for left and right lenses respectively).

A base 29 may (FIGS. 2 and 3) be secured to one end of the plate portion 11 or formed unitarily therewith and provided with a rim 30 upstanding thereon. When the pockets are closed (FIG. 7) a cup-shaped member 31 (FIG. 8) may telescopically enclose them and frictionally engage the rim 30 of the base 29 to secure the parts in assembled closed position for conveniently carrying the same or positioning in essentially upright position (FIG. 8) on a supporting surface S.

Absorbent pads 32, 33 (FIG. 5) may be positioned in or secured to the cover and pocket members respectively and may be provided with complementary concavo-convex surfaces, so that, when an optical contact lense is positioned in a pocket and the cover closed thereover, said pad will conform to the contour of said lens. The pads may be held in the cover and pocket members by any suitable means, as, for example, by forming the bottom walls of the cover members with upstanding rims 36 (FIG. 3) within which said pads may be positioned and by forming the pocket members with undercut marginal fingers 37 (FIG. 2) to receive and hold the pads 33. The user may moisten said pads with any liquid desired for keeping the lenses clean or moist or to prevent excess dryness.

While a specific embodiment of the invention has been shown and described, the invention is not limited to the exact details of construction set forth, and the invention embraces such changes, modifications and equivalents of the parts and their formation and arrangement as come within the purview of the appended claims.

Having thus described my invention, what I claim as new and desire to secure by Letters Patent is:

1. A holder for optical contact lenses comprising an elongated, flat plate portion having a longitudinal axis and adapted to be positioned on a supporting surface, side and end walls upstanding on said plate portion and transverse walls intermediate said side walls and defining therewith and with the plate portion and end walls, pockets arranged in axial alignment along the longitudinal axis of the plate portion and substantially coextensive with the width of the plate at right angles to said longitudinal axis, opening upwardly, away from the plate portion, for reception of lenses, hollow cover members proportioned to close said pockets when positioned thereon, complementary means on the hollow cover members and pockets for interengaging the cover members with the pockets in closed relation, and a flat base portion at one end of said plate portion and substantially at right angles thereto, said base extending substantially beyond the periphery of said one end wall and having a lower end parallel to the plane of the plate portion, to facilitate positioning the holder on the supporting surface by positioning the base portion on such surface, with the plate portion pockets extending upwardly therefrom, and the lenses enclosed therein.

2. In a holder for optical lenses as set forth in claim 1, said cover member having a bottom wall and a ridge upstanding from said bottom wall, an absorbent pad positioned in said ridge on which said lens may be positioned.

3. In a holder for optical lenses as set forth in claim 1, said cover member having a bottom wall, an upstanding ridge formed on said bottom wall to receive an absorbent pad, an absorbent pad positioned in said pocket member, the outermost ends of said pads being formed complementarily concave and convex for holding an optical contact lens therebetween when the cover member is closed on the pocket member.

4. In a holder for optical contact lenses as set forth in claim 1, an upstanding rim provided on said base portion, an elongated hollow closure cup positioned over the holder and closed pocket members, and engaging the rim on the flat base portion to close the holder.

References Cited in the file of this patent

UNITED STATES PATENTS

| | | |
|---|---|---|
| 625,138 | Boyd | May 16, 1899 |
| 1,848,109 | Crotty | Mar. 8, 1932 |
| 2,642,987 | Castelli | June 23, 1953 |
| 2,687,157 | Cowan | Aug. 24, 1954 |
| 2,932,383 | Fagan | Apr. 12, 1960 |
| 2,948,387 | Fishman | Aug. 9, 1960 |

FOREIGN PATENTS

| | | |
|---|---|---|
| 657,516 | Great Britain | Sept. 19, 1951 |